(12) United States Patent
Nag et al.

(10) Patent No.: US 9,117,308 B1
(45) Date of Patent: Aug. 25, 2015

(54) METHODS AND SYSTEMS FOR CONVERTING SELECT FEATURES OF A COMPUTER-AIDED DESIGN (CAD) MODEL TO DIRECT-EDIT FEATURES

(71) Applicant: Dassault Systemes SolidWorks Corporation, Waltham, MA (US)

(72) Inventors: Arunabha Nag, Acton, MA (US); Timothy D. Gallagher, Rosendale, NY (US); Joseph J. Dunne, San Diego, CA (US)

(73) Assignee: Dassault Systemes Solidworks Corporation, Waltham, MA (US)

( * ) Notice: Subject to any disclaimer, the term of this patent is extended or adjusted under 35 U.S.C. 154(b) by 350 days.

(21) Appl. No.: 13/725,955

(22) Filed: Dec. 21, 2012

Related U.S. Application Data

(60) Provisional application No. 61/581,495, filed on Dec. 29, 2011.

(51) Int. Cl.
*G06T 19/20* (2011.01)
*G06F 17/50* (2006.01)

(52) U.S. Cl.
CPC .............. *G06T 19/20* (2013.01); *G06F 17/50* (2013.01)

(58) Field of Classification Search
CPC ...................................................... G06F 17/50
USPC ................... 345/419, 420; 700/182; 715/964
See application file for complete search history.

(56) References Cited

U.S. PATENT DOCUMENTS

| | | |
|---|---|---|
| 2010/0013833 A1* | 1/2010 | Gandikota et al. ............ 345/420 |
| 2010/0232701 A1* | 9/2010 | Mawby et al. ................ 382/190 |
| 2011/0025688 A1* | 2/2011 | Schneider et al. ............ 345/420 |
| 2012/0078580 A1* | 3/2012 | Staples et al. ..................... 703/1 |
| 2012/0084060 A1* | 4/2012 | Gunasena et al. ................ 703/1 |
| 2012/0109350 A1* | 5/2012 | Buchowski et al. ............ 700/98 |

OTHER PUBLICATIONS

Gortler, S. and Cohen, M., "Variational Geometric Modeling with Wavelets," *Hierarchical and Variational Geometric Modeling with Wavelets*. In Proceedings of the 1995 symposium on interactive 3D graphics, pp: 167-174 (1995).

Wong, K., "Direct Modeling versus Parametric Modeling: The Historical Debate Continues," *Desktop Engineering* (Dec. 2012). Retrieved from the internet URL: http://www.deskeng.com/articles/aaarfa.htm.

"Dassault Systemes SolidWorks Corporation Company Overview," *Bloomberg Businessweek*, (Jan. 2012). Retrieved from the internet URL: http://investing.businessweek.com/research/stocks/private/snapshot.asp?privcaId=34529.

(Continued)

*Primary Examiner* — Maurice L McDowell, Jr.
(74) *Attorney, Agent, or Firm* — Hamilton, Brook, Smith & Reynolds, P.C.

(57) ABSTRACT

Editing features of a history-based computer-aided design (CAD) model may be difficult and may require redesigning much of the CAD model modify features. The solutions described herein allow a design engineer to modify an existing history-based CAD model by automatically determining history-based features that need to be converted to direct-edit features, creating a body of direct-edit features from the determined features, and creating a model containing both the direct-edit feature body and remaining history-based features. Such a CAD model containing both kinds of features may be referred to as a hybrid model.

21 Claims, 7 Drawing Sheets

(56) References Cited

OTHER PUBLICATIONS

Stackpole, B., "All Aboard the Direct Modeling Train," *DesignNews*, (Dec. 21, 2012). Retrieved from the internet URL: http://designews.com/document.asp?doc_id=228266&print=yes.

"Synchronous Technology" *Collaborative Product Development Associates, LLC*, pp. 1-18 (Apr. 2008).

Ushakov, D., Variation Direct Modeling: How to Keep Design Intent in History-Free CAD, *Ledas* pp. 1-10 (Oct. 2008).

* cited by examiner

METHODS AND SYSTEMS FOR CONVERTING SELECT FEATURES OF A COMPUTER-AIDED DESIGN (CAD) MODEL TO DIRECT-EDIT FEATURES

RELATED APPLICATION(S)

This application claims the benefit of U.S. Provisional Application No. 61/581,495, filed on Dec. 29, 2011.

The entire teachings of the above application(s) are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly. A subassembly may also consist of other subassemblies. An assembly is designed using parts and subassemblies. Parts and subassemblies are hereinafter collectively referred to as components.

A solid modeling system may be a feature-based 3D CAD system wherein a part is constructed using various features. Examples of features include bosses, fillets, chamfers, cuts, holes, shells, lofts, and sweeps. Commercially available feature-based modeling systems include the SolidWorks® 2012 software system available from Dassault Systèmes SolidWorks Corporation of Waltham, Mass. SolidWorks software and other commercially available CAD systems store the contents of parts, subassemblies, and assemblies in a data file. In addition to features, the contents of CAD data files may include design profiles, layouts, internal components, and graphical entities.

Two approaches for building CAD models are history-based modeling and direct-edit modeling, the later of which may be referred to as variational modeling. In general, with history-based CAD models, the modeling process may begin by creating a base feature controlled by a two-dimensional sketch, which then may be extruded using, by way of non-limiting example, a revolve, a loft, or a sweep operation. Each subsequent feature of a model of a part is built on a previous feature, and therefore is dependent on a previously created feature. When the design engineer edits a feature of the history-based model, the model is rolled back to a previous state; the state prior to the creation of subsequent dependent features.

Working with a complex history-based CAD model often becomes difficult when a design engineer needs to modify the CAD model. The design engineer must understand how the particular model was built, at times in step-by-step detail, and may need to determine the right parameters that need modification to achieve the desired changes in the output geometry of the model. Quite often, the design engineer cannot find the parameters necessary to make the desired changes. This may occur, for example, if the model was designed with an intention that conflicts with the desired changes. History-based modeling, however, is often viewed as a more powerful approach than direct-edit modeling when designing a complex 3D model because a history-based record of interdependencies reflects design intent and, also importantly, allows feature modifications to automatically apply to features that are dependent on modified features. Thus, history-based modeling is the preferred approach by many designers.

In contrast to a history-based modeler, a direct-edit modeler allows a design engineer to modify a CAD model's geometry without considering the order in which features were created, thereby allowing a design engineer to change a design quite easily, in general. Thus, the design engineer is not required to understand how that model was designed step by step, and changes may be made more quickly because features do not need to be re-created, as do the dependent features in a history-based modeler. Further, the design engineer can optionally add constraints between geometries and can modify a geometry by modifying a dimension value that transforms the geometry. Direct-edit modeling, however, lacks the power of parametric modeling, available with history-based modelers, with regards to working with complex geometries.

With currently available history-based modelers, a design engineer may need to redesign those features that are directly or indirectly dependent upon a feature that was modified in a history-based CAD model, which may be a significant portion of the model. Alternatively, the CAD model may be exported to a model having a format without any feature history or parametric data, then the resulting geometry may be imported into an application that supports direct-editing of the geometry. These existing solutions have limitations. Redesigning the entire history-based CAD model is time consuming and forces the design engineer to re-design many features even though the design for those features may not have changed. Exporting the CAD model without feature history or parametric data removes valuable parametric information, which is an all-or-nothing approach.

Some technologies allow a design engineer to have both history-based features and direct-edit features in the same model. Such technologies place the direct-edit features before the history-based features in the feature order. The design engineer can move some features from a history-based set of features to a direct-edit set of features, but when one of those features is moved from the history-based set to the direct-edit set, all history-based features created prior to the feature being moved are also moved, regardless of any interdependencies. This is a disadvantage if the design engineer wants to keep those other features as history-based features.

Other technologies allow design engineers to simulate direct-modeling with a history-based CAD model, where the design engineer can open the CAD model in either a direct-edit modeler or history-based modeler. The design engineer can modify the model utilizing direct-modeling methods (e.g., pushing and pulling faces); however, the modeler changes the CAD model by adding history-based features in the background, thereby affecting the actual changes to the model. A disadvantage with such technologies is that the simulation of direct-editing creates complex history-based features with questionable value to the CAD model. Further, because such technologies are actually history-based approaches, these technologies cannot handle constraints as other direct-modelers do with a variational approach.

Other technologies allow design engineers to switch between direct-edit and history-based modeling modes in the same application. When in direct-modeling mode, the design engineer can modify geometries utilizing direct-modeling techniques (e.g., pushing and pulling faces). The application records the changes that the design engineer makes in the direct-edit mode, and when the design engineer switches back to the history-based mode, the application tries to modify the history-based features so that the end result includes the changes made in the direct-edit mode. A disadvantage of this approach is that the application may be unable to find the right parameters in the model's history to make the design engineer's intended changes. Further, because this dual-mode approach is actually history-based, the dual-mode approach cannot handle constraints as do other direct-modelers with a variational approach.

Currently available technologies attempt to address the problems heretofore discussed, but fall short of the solutions later to be described herein for various reasons. Such solutions allow for time-saving advantages and enhancements to current CAD systems, achieved by providing more efficient means for modifying CAD models while maintaining parametric data included in the design.

SUMMARY OF THE INVENTION

In general, in one aspect, embodiments of the invention feature a computer-implemented method of automatically converting select features of a computer-aided design (CAD) model to direct-edit features. The method involves selecting one or more features of the CAD model to convert to direct-edit features. Given a history-based data structure associated with the CAD model, it is determined which other features of the CAD model need to be converted by analyzing dependency relationships between the selected features and the other features. Based on this determination, the selected features and the other features are converted to direct-edit features, resulting in the CAD model being comprised of history-based features and direct-edit features.

After conversion, direct-edit modeling may be performed on the direct-edit features of the model. Such direct-edit modeling may include, for example, transforming a geometrical surface, adding dimensions and constraints between surfaces of a direct-edit-feature's body, and modifying geometries by modifying dimensions and constraints.

In some embodiments, the determination of the other features may comprise analyzing topological faces of an output body of the selected features and identifying parent features of the features selected for conversion in order to form a direct-edit geometry. The parent features may be determined recursively until no other parent feature is determined. The determination may end when a minimum number of other features needed to form a direct-edit geometry have been identified.

Some embodiments may generate a conversion queue from the selected features and the other features based on the dependency relationships between the selected features and the other features, and converting the features may include removing the selected features and the other features from the history-based data structure, creating a direct-edit geometry from one or more geometrical faces of the selected features and the other features, and combining the history-based data structure and the direct-edit geometry. The resulting CAD model may then include history-based features and direct-edit features.

Other embodiments include a computer-aided design (CAD) system having a processor operatively coupled to a data storage system and a data storage memory operatively coupled to the processor. In such embodiments, the data storage system stores a three-dimensional model, and the data storage memory comprises instructions to configure the processor to (i) enable selection of one or more features of the three-dimensional model for conversion to one or more direct-edit features, (ii) determine other features of the three-dimensional model to convert based on an order of creation of the selected features, and (iii) convert the selected features and the other features to one or more direct-edit features. The resulting three-dimensional model may then include history-based features and direct-edit features.

Yet other embodiments include a computer-readable data storage medium containing instructions for automatically converting select features of a computer-aided design (CAD) model to one or more direct-edit features. The instructions enable selection of one or more features of the model to be converted to one or more direct-edit features. The instructions further determine a set of other features of the CAD model that depend on the selected features via a parent-child relationship, and convert the selected features and the set of other features to one or more direct-edit features. The resulting CAD model then includes one or more history-based features and one or more direct-edit features.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

As previously described, editing features in a history-based CAD model is difficult and may require redesigning much of the CAD model to modify one or more features. The solution described herein allows a design engineer to modify existing features in a history-based CAD model without having to re-design many of the features. The solution automatically determines a set of history-based features that need to be replaced by a set of direct-edit features, creating a body of direct-edit features from the determined set of features, and creating a model that contains both the converted direct-edit features and any remaining history-based features. Such a CAD model containing both kinds of features will herein be referred to as a hybrid model. Further, the design engineer can then add new dimensions to the direct-edit features of the hybrid model and can establish a new design intent.

The inventive concepts described herein not only allow a design engineer to make changes to a model without rolling back the model to a previous state, and thereby forcing the design engineer to create the same features again, but also allows a design engineer to redefine design intent in a model while retaining parametric and constraint data. In one example embodiment, this is achieved by identifying in a history structure of the CAD model a set of features that will be affected by one or more features selected for direct editing. Those identified features along with the selected features are then separated from the history structure and replaced with direct-edit features. Other history-based features remain unchanged. The design engineer is then able to add or modify parameters and constraints of the direct-edit features of the CAD model (such as, by way of non-limiting example, a distance or angle between two surfaces or a radius of a cylinder). In some embodiments, the maximum number of history-based features as possible are kept unchanged and a minimum number of features are converted to direct-edit features. The final geometric results should appear the same as the geometric result prior to the conversion to a hybrid model. After features are transformed from history-based parametric modeling to direct modeling features, direct modeling operations may be performed on the direct-edit feature body.

Figure 1:
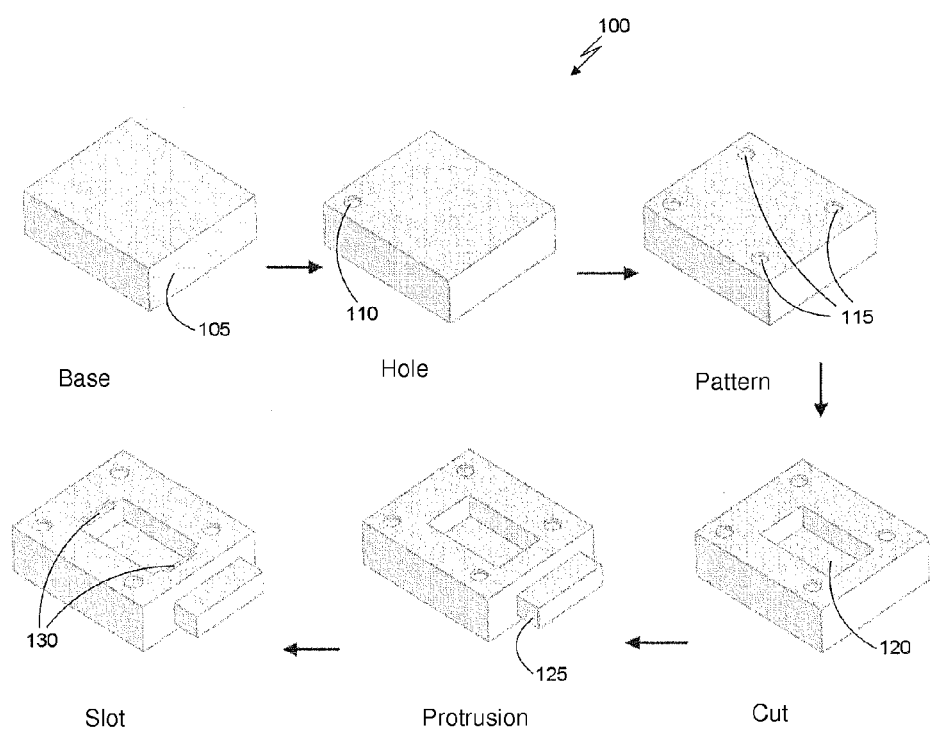
FIG. 1 is an illustration of features that make up an example history-based computer-aided design (CAD) model.

FIG. 1 is an illustration of features that make up an example history-based CAD model 100. The example CAD model 100 is built by first creating Base 105, following in order by Hole 110, Pattern 115, Cut 120, Protrusion 125, and Slot 130. A dependency chart may then be built, as will be described with reference to FIG. 3 (e.g., by identifying neighboring faces and then discovering one or more features containing those faces). Such a dependency chart describing the relationships among the features in FIG. 1 is as follows:

| Feature | Parent(s) |
| --- | --- |
| Base 105 | — |
| Hole 110 | Base 105 |
| Pattern 115 | Base 105 |
| Cut 120 | Base 105 |
| Protrusion 125 | Base 105 |
| Slot 130 | Cut 120 & Base 105 |

The dependency chart indicates that in order to convert the Slot feature 130 to a direct-edit feature, the Base 105 and Cut 120 features also need to be converted. After sorting the features, a conversion queue may be generated containing Base 105, Cut 120, and Slot 130. An example conversion process may proceed as follows:

(1) The Base history-based feature 105 becomes the initial body of the direct-edit geometrical body, and the Base history-based feature 105 is removed from the history-based CAD model.

(2) The geometrical surfaces of the Cut history-based feature 120 are embedded in the direct-edit geometrical body, and the Cut history-based feature 120 is removed from the history-based CAD body.

(3) The geometrical surfaces of the Slot history-based feature 130 are then included in the direct-edit geometrical body, and the Slot history-based feature 130 is removed from the history-based CAD body.

(4) At this point the conversion queue is empty, and the direct-edit geometrical body becomes the final body of the direct-edit portion of the hybrid model.

(5) The history-based body, which includes the remaining Hole, Pattern, and Protrusion history-based features 110, 115, 125, are applied to the direct-edit geometrical body, such that a new feature structure of the CAD model includes the body having the Hole history-based feature 110, Pattern history-based feature 115, and Protrusion history-based feature 125 dependent on the direct-edit geometrical body.

Figure 2:
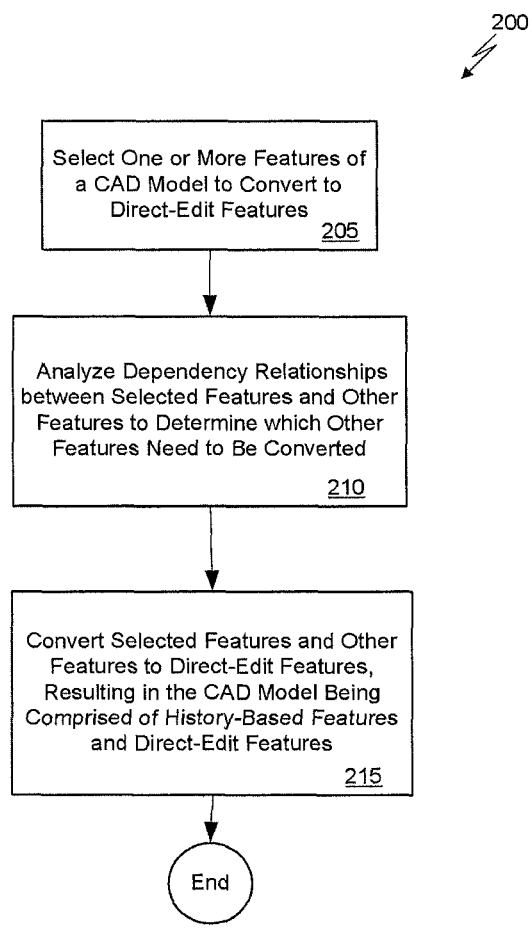
FIG. 2 is a flow diagram illustrating automatic conversion of select features of a computer-aided design (CAD) model to direct-edit features, according to an example embodiment of the present invention.

Referring now to FIG. 2, a process 200 for automatically converting select features of a CAD model to direct-edit features is shown, according to an example embodiment of the present invention. To begin, process 200 selects one or more features of a CAD model to convert to direct-edit features (step 205). The selected features may be specified via a design engineer's selection or interaction with the CAD model. Given a history-based data structure associated with the CAD model, process 200 automatically determines which other features of the CAD model need to be converted; such determination is done by analyzing dependency relationships between the selected features and the other features (step 210). Based on this determination, the selected features and the other features are converted to direct-edit features, resulting in the hybrid CAD model being comprised of history-based features and direct-edit features (step 215).

Figure 3:
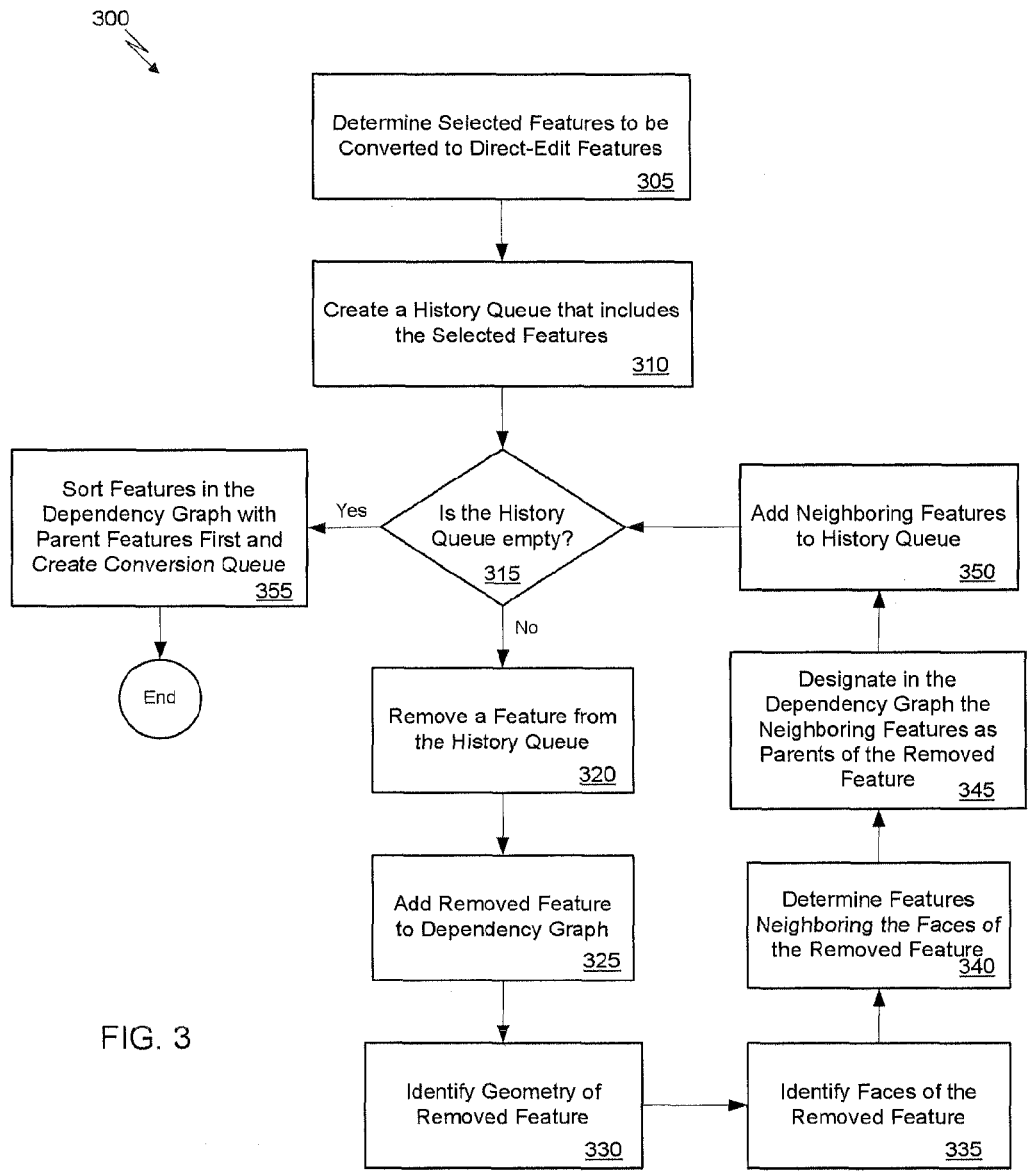
FIG. 3 is a flow diagram illustrating generation of a conversion queue from selected features and other features based on dependency relationships, according to an example embodiment of the present invention.

Referring now to FIG. 3, an example process 300 for generating a conversion queue from selected features and other features based on dependency relationships is shown, according to an example embodiment of the present invention. The example process 300 begins with an initial set of features to be converted to direct-edit features (step 305). The initial set may be specified via a design engineer's selection or interaction with the CAD model, as discussed with reference to step 205 in FIG. 2. For example, a design engineer may select one or more faces within the CAD model to convert to direct-edit geometry. The features associated with those faces become the initial set of features to be converted to direct-edit features. The geometries of only those features, however, might not make a complete geometric body. To make a complete direct-edit geometric body, the example process 300 determines additional features (e.g., parent features of the initial feature set) that need to be converted in order to make a complete geometric body (step 210 in FIG. 2). From the set of selected and additional features, the example process 300 builds a conversion queue and converts the features from the conversion queue to construct a body of direct-edit features. As described, to build a conversion queue, the process determines dependency relationships between other features and the selected features. Such a dependency relationship is a parent-child relationship. Determination of the other features may be facilitated by the use of an analysis queue. The analysis queue is a collection of features that are analyzed to determine dependencies of those features in the queue. The analysis queue arranges features in reverse chronological order with respect to when features were created, which facilitates analyzing each feature only once. The analysis queue is an intermediate queue used to create the conversion queue, as described below.

The example process 300 creates an analysis queue that includes the selected features to be converted (step 310). The process 300 then checks whether the analysis queue is empty (step 315). While not empty, the first feature listed in the analysis queue is removed from the analysis queue (step 320) and added to a dependency graph (step 325), which is built during the example process 300. The topological faces of the removed feature are identified (step 335). The example process 300 then determines features that neighbor the identified faces and that were created prior to the creation of the identified features (step 340), and those neighboring features are then designated in the dependency graph as parents of the removed feature (step 345). The neighboring features are also added to the analysis queue (step 350), allowing the process 300 to recursively analyze each parent feature upon which a feature in the analysis queue depends. Thus, parent features are identified by analyzing the history of feature creation and determining how the topology of the selected features was constructed. For example, if a Feature B contributed to the construction of a Feature A and Feature B has faces adjacent to faces of Feature A, then Feature B is designated as a parent of Feature A. In order to convert Feature A to a direct-edit feature, Feature B has to be converted as well. A feature may have multiple parent features (e.g., direct parents and grandparents).

When the process 300 tests whether the analysis queue is empty (step 315), and the analysis queue is empty, the process 300 performs a sort operation on the features in the dependency graph to arrange the features in order of their dependency (i.e., parents first), and creates the conversion queue (step 355).

Figure 4:
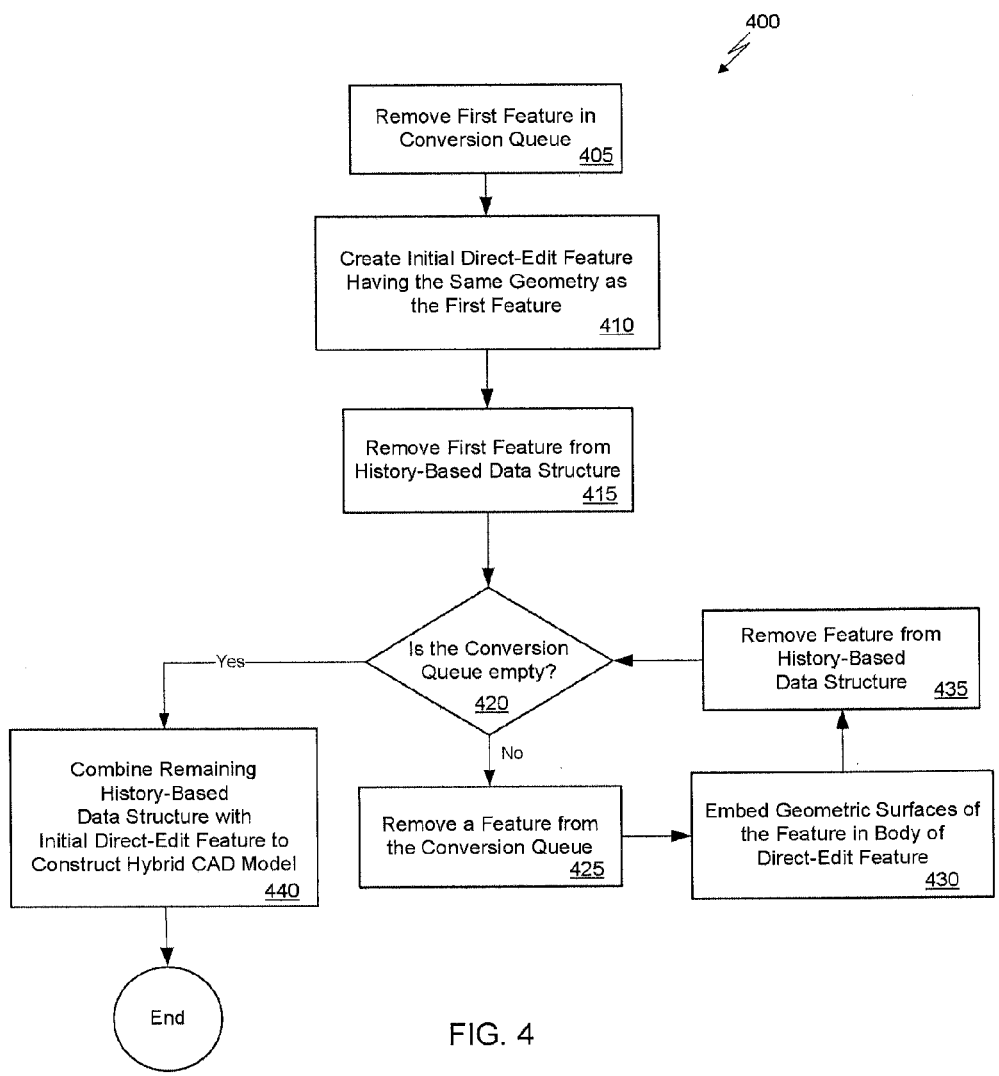
FIG. 4 is a flow diagram illustrating conversion of select features to direct-edit features, according to an example embodiment of the present invention.

Referring now to FIG. 4, an example process 400 for converting select features to direct-edit features is shown, according to an example embodiment of the present invention. Input for the example process 400 is a conversion queue of history-based features, such as that described with reference to FIG. 3. According to the example process 400, the first history-based feature in the conversion queue is removed from the conversion queue (step 405), and a direct-edit feature is created from the first feature removed from the conversion queue (step 410). The direct-edit feature has the same or almost identical geometry as the first removed feature. In the next step, the first history-based feature is removed from the CAD model (step 415).

At this point, the process 400 checks whether the conversion queue is empty (step 420). If not yet empty, the next history-based feature in the conversion queue is removed from the conversion queue (step 425), and the feature is converted by embedding the geometry of the feature in the direct-edit feature body (step 430). The history-based feature is then removed from the CAD model (step 435). Steps 420, 425, 430, and 435 are repeated until all features in the conversion queue are processed. When the conversion queue is empty (tested in step 420), all of the selected and related features have been converted to direct-edit features. The example process 400 then combines the remaining history-based data structure (e.g., remaining history-based features of the CAD model) with the direct-edit feature body to construct a hybrid CAD model (step 440).

Figure 5:
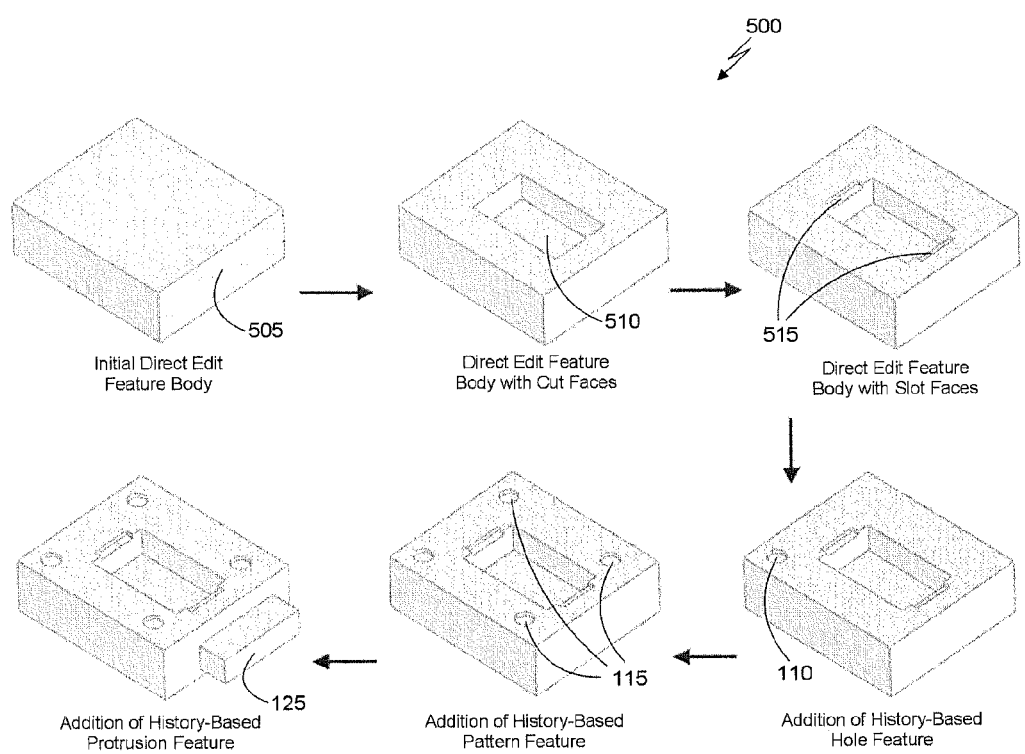
FIG. 5 is an illustration of a hybrid CAD model including direct-edit features and history-based features applied to the direct-edit geometry, according to an example embodiment of the present invention.

FIG. 5 is an illustration of a hybrid CAD model 500 including direct-edit features and history-based features applied to the direct-edit geometry, according to an example embodiment of the present invention. The illustrated CAD model 500 is an example hybrid CAD model that may result from applying the above example processes 200, 300, and 400, to the history-based CAD model 100 of FIG. 1. As shown, the CAD model 500 includes a direct-edit feature body having the geometrical features of the original Base 505, geometrical features of the original Cut 510, and geometrical features of the original Slot 515 features. Applied to that direct-edit body are the history-based features of Hole 110, Pattern 115, and Protrusion 125.

Figure 6:
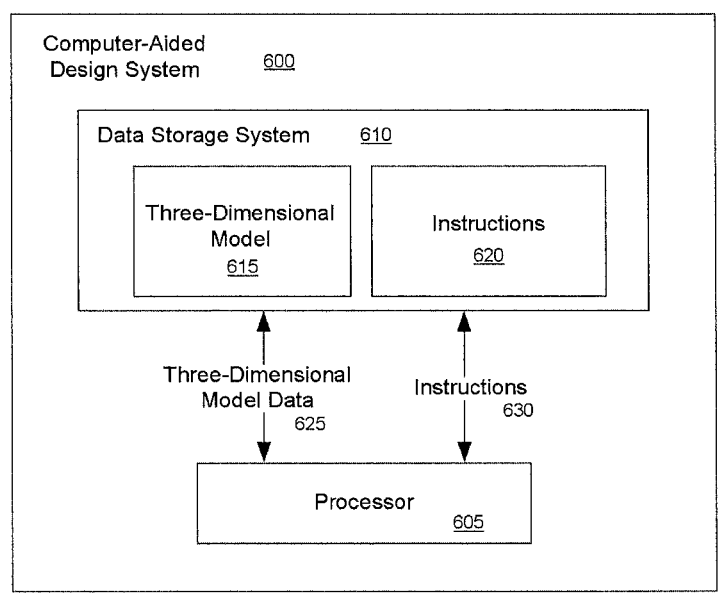
FIG. 6 is a block diagram illustrating a CAD system according to an example embodiment of the present invention.

FIG. 6 is a block diagram illustrating a CAD system 600 according to an example embodiment of the present invention. The example system 600 includes a processor 605 operatively coupled to a data storage system 610 and a data storage memory operatively coupled to the processor 605. The data storage system 610 stores a three-dimensional model 615, and the data storage memory comprises instructions 620, 630 to configure the processor 605 to enable selection of one or more features 625 of the three-dimensional model 615 for conversion to one or more direct-edit features. The processor 605 determines other features 625 of the three-dimensional model 615 to convert based on an order of creation of the selected features, and converts the selected features and the other features to one or more direct-edit features. The resulting three-dimensional model 615 then includes history-based features and direct-edit features.

Figure 7:
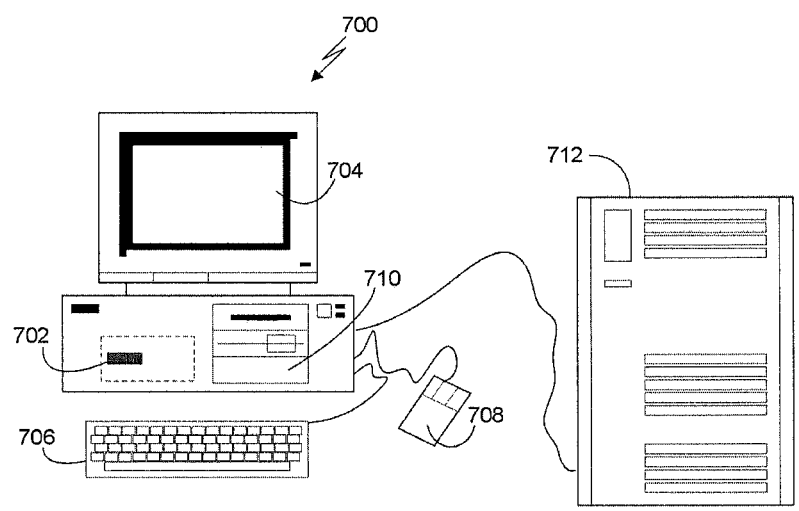
FIG. 7 is a schematic diagram of a computer system in which embodiments of the present invention may be implemented.

FIG. 7 illustrates a computerized modeling system 700 that includes a CPU 702, a computer monitor 704, a keyboard input device 706, a mouse input device 708, and a storage device 710. The CPU 702, computer monitor 704, keyboard 706, mouse 708, and storage device 710 can include commonly available computer hardware devices. For example, the CPU 702 can include an Intel-based processor. The mouse 708 may have conventional left and right buttons that the design engineer may press to issue a command to a software program being executed by the CPU 702. As an alternative or in addition to the mouse 708, the computerized modeling system 700 can include a pointing device such as a trackball, touch-sensitive pad, or pointing device and buttons built into the keyboard 706. Those of ordinary skill in the art appreciate that the same results described herein with reference to a mouse device can be achieved using another available pointing device. Other appropriate computer hardware platforms are suitable as will become apparent from the discussion that follows. Such computer hardware platforms are preferably capable of operating the Microsoft Windows NT, Windows 2000, Windows XP, Windows ME, Windows 7, UNIX, Linux, or MAC OS operating systems.

Additional computer processing units and hardware devices (e.g., rapid prototyping, video, and printer devices) may be included in the computerized modeling system 700. Furthermore, the computerized modeling system 700 may include network hardware and software thereby enabling communication to a hardware platform 712, and facilitating communication between numerous computer systems that include a CPU and a storage system, among other computer components.

Computer-aided modeling software (e.g., processes 200, 300, and 400 and instructions 620, 630) may be stored on the storage device 710 and loaded into and executed by the CPU 702. The modeling software allows a design engineer to create and modify a 3D model and implements aspects of the invention described herein. The CPU 702 uses the computer monitor 704 to display a 3D model and other aspects thereof as described. Using the keyboard 706 and the mouse 708, the design engineer can enter and modify data associated with the 3D model. The CPU 702 accepts and processes input from the keyboard 706 and mouse 708. The CPU 702 processes the input along with the data associated with the 3D model and makes corresponding and appropriate changes to that which is displayed on the computer monitor 704 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

The embodiments disclosed herein allow select features of a history-based CAD model to be easily converted to direct-edit features. This enables a design engineer to change the design of a history-based model with minimal effort. An advantage of the embodiments disclosed herein is that the design engineer benefits from having both history-based modeling along with capabilities of direct-modeling within one model. Much of the original, history-based, parametrically captured, design intent can continue to be maintained and updated as part of a hybrid model. A further advantage is that only a minimum number of features are converted to a direct-edit model, thereby preserving as much as possible powerful parametric capabilities. Yet another advantage is that the design engineer controls the selection of features that will be converted to a direct-edit data structure. Additionally, the design engineer can redefine a model's design by means of redefining a feature or adding constraints and other parameters to the model that would be lost during conventional conversion.

A number of embodiments of the present invention have been described. Nevertheless, it will be understood that various modifications may be made without departing from the spirit and scope of the invention. Furthermore, implementations may change the order in which operations are performed. Furthermore, depending on the needs of an implementation, particular operations described herein may be implemented as a combined operation, eliminated, added to, or otherwise rearranged.

What is claimed is:

1. A computer-implemented method of automatically converting select features of a computer-aided design (CAD) model to direct-edit features, the method comprising:
   selecting one or more features of the CAD model to convert to direct-edit features;
   given a history-based data structure associated with the CAD model, determining which other features of the CAD model need to be converted by analyzing dependency relationships between the selected features and the other features; and
   converting the selected features and the other features to direct-edit features, resulting in the CAD model being comprised of history-based features and direct-edit features.

2. The computer-implemented method of claim 1, wherein determining further comprises analyzing topological faces of an output body of the selected features and identifying parent features of the selected features for conversion to form a direct-edit geometry.

3. The computer-implemented method of claim 2, wherein identifying parent features includes recursively determining parent features until no other parent feature is determined.

4. The computer-implemented method of claim 1, further including generating a conversion queue from the selected features and the other features based on the dependency relationships.

5. The computer-implemented method of claim 1, wherein determining the other features includes determining a minimum number of other features needed to form a direct-edit geometry.

6. The computer-implemented method of claim 1, wherein converting the selected features and the other features includes:
   removing the selected features and the other features from the history-based data structure;
   creating a direct-edit geometry from one or more geometrical faces of the selected features and the other features; and
   combining the history-based data structure and the direct-edit geometry, resulting in the CAD model including history-based features and direct-edit features.

7. The computer-implemented method of claim 1, further including enabling direct-edit modeling to be performed on the direct-edit features of the model.

8. The computer-implemented method of claim 7, wherein direct-edit modeling is at least one of translating a geometrical face, adding dimensions to a geometrical body, and adding constraints to a geometrical body.

9. A computer-aided design system comprising:
   a processor operatively coupled to a data storage system, the data storage system storing a three-dimensional model; and
   a data storage memory operatively coupled to the processor and comprising instructions to configure the processor to:
      enable selection of one or more features of the three-dimensional model for conversion to one or more direct-edit features;
      determine other features of the three-dimensional model to convert based on an order of creation of one or more selected features; and
      convert the selected features and the other features to one or more direct-edit features, resulting in the three-dimensional model including history-based features and direct-edit features.

10. The computer-aided design system of claim 9, wherein the processor is further configured to determine the other features by analyzing parent-child relationships of the selected features.

11. The computer-aided design system of claim 10, wherein the processor is further configured to determine parent-child relationships by recursively determining parent-child relationships until no other parent feature is determined.

12. The computer-aided design system of claim 9, wherein the processor is further configured to generate a conversion queue from the selected features and the other features based on dependencies among the selected features and the other features.

13. The computer-aided design system of claim 9, wherein the processor is further configured to determine the other features by determining a minimum number of the other features needed to form a direct-edit geometry.

14. The computer-aided design system of claim 9, wherein the processor is further configured to convert the selected features and the other features by:
removing the selected features and the other features from a history-based data structure associated with the three-dimensional model;
creating a direct-edit geometry from geometrical faces of the selected features and the other features; and
combining a set of history-based features remaining in the history-based data structure and the direct-edit geometry to form a three-dimensional model comprised of history-based features and one or more direct-edit features.

15. The computer-aided design system of claim 9, wherein the processor is further configured to enable direct-edit modeling operations to be performed on the direct-edit features of the model.

16. A non-transitory computer-readable data storage medium having computer-readable program codes embodied therein for automatically converting select features of a computer-aided design (CAD) model to one or more direct-edit features, the computer-readable data storage medium program codes including instructions that, when executed by a processor, cause the processor to:
enable selection of one or more features of the model to convert to one or more direct-edit features;
determine a set of other features of the CAD model that are dependent, via a parent-child relationship, upon one or more selected features; and
convert the selected features and the set of other features to one or more direct-edit features, resulting in the CAD model including one or more history-based features and one or more direct-edit features.

17. The computer-readable data storage medium of claim 16, wherein the instructions cause the processor to determine parent features by recursively determining parent features until no other parent feature is determined.

18. The computer-readable data storage medium of claim 16, wherein the instructions cause the processor to generate a conversion queue from the selected features and the set of other features based on dependencies among the features.

19. The computer-readable data storage medium of claim 16, wherein the instructions cause the processor to determine the set of other features by determining a minimum number of affected features needed to form a direct-edit geometry.

20. The computer-readable data storage medium of claim 16, wherein the instructions cause the processor to convert the selected features and the set of other features by:
removing the selected features and the set of other features from a history-based data structure associated with the CAD model;
creating a direct-edit geometry from one or more geometrical faces of the selected features and the set of other features; and
combining a set of features remaining in the history-based data structure and the direct-edit geometry to form a CAD model comprised of one or more history-based features and one or more direct-edit features.

21. The computer-readable data storage medium of claim 16, wherein the instructions cause the processor to enable a direct-edit modeling operation to be performed on one or more of the direct-edit features of the model.

* * * * *